United States Patent [19]

Bessinger

[11] 4,113,057
[45] Sep. 12, 1978

[54] PORTABLE SUPPORT

[76] Inventor: Max E. Bessinger, R.R. 3, Box 415, Three Rivers, Mich. 49093

[21] Appl. No.: 780,606

[22] Filed: Mar. 24, 1977

[51] Int. Cl.² .......................... A47C 9/10; A47F 5/12
[52] U.S. Cl. .......................................... 182/187; 108/2
[58] Field of Search ...................... 182/187, 82; 108/1, 108/2, 6

[56] References Cited

U.S. PATENT DOCUMENTS

| 2,394,203 | 2/1946 | Pruder | 182/187 |
| 3,419,108 | 12/1968 | Mobbs | 182/187 |
| 3,885,649 | 5/1975 | Damron | 182/187 |
| 3,990,537 | 11/1976 | Swenson | 182/187 |

*Primary Examiner*—Reinaldo P. Machado
*Attorney, Agent, or Firm*—Gordon W. Hueschen

[57] ABSTRACT

A tree stand, seat, or table adapted to be attached to a tree or like vertical column, comprising a board or like planar support member, provided with piercing points adapted to engage the tree, tie-attaching means substantially below said piercing points, and tie means for tying said tie-attaching means against said tree with the seat in vertical position along side the tree. Spring means is interposed between the tie means and the board or between the piercing points and the board so that when the board is rotated up to the horizontal position, the spring means is loaded and forces the piercing points into the tree and tends to cause the seat to return to its initial vertical position along side the tree. Brace means is provided to hold the board in horizontal position which has piercing points at the lower end which are forced into the tree when the board is moved toward the initial position and which are held in engagement with the tree by the spring means, tending to cause the board to rotate toward the initial position.

30 Claims, 23 Drawing Figures

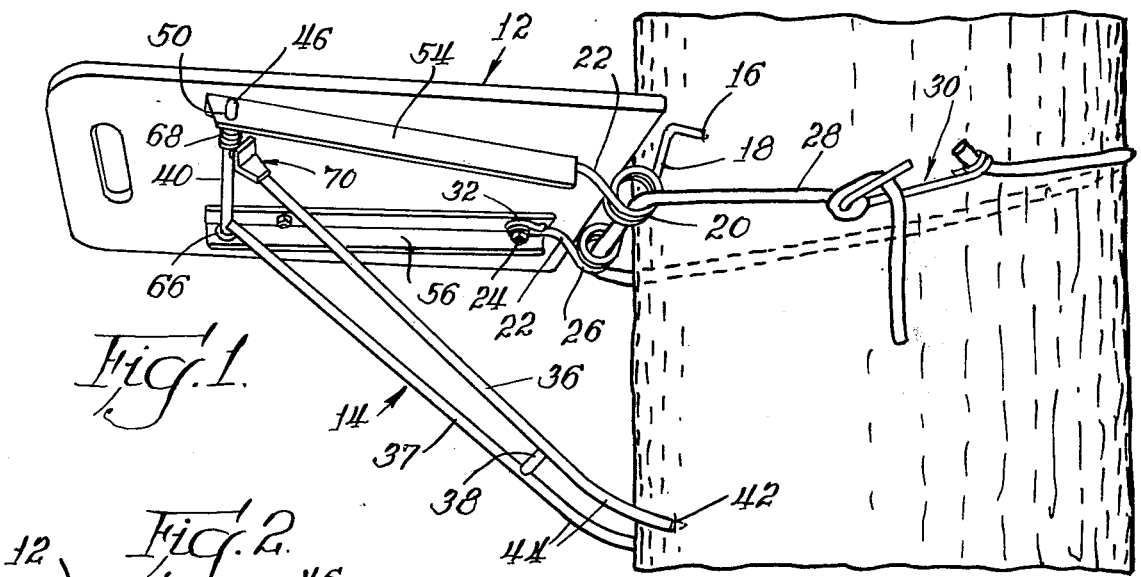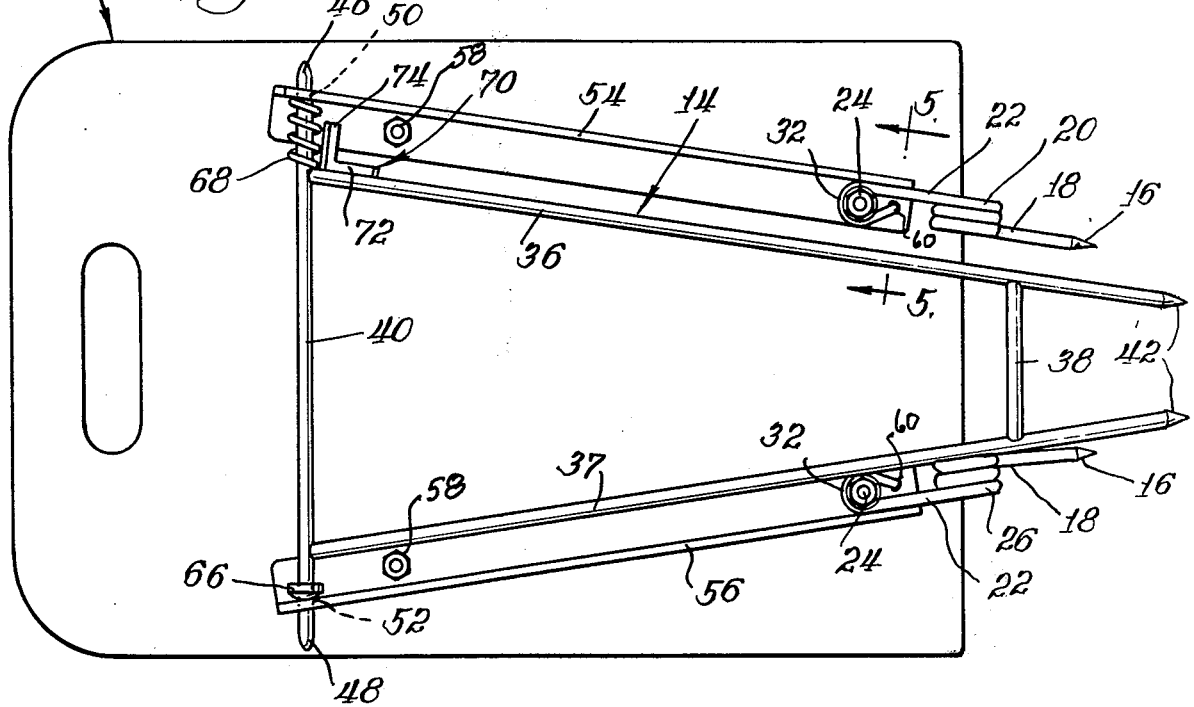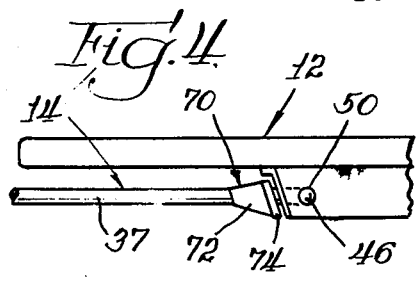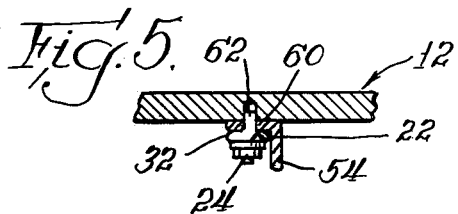

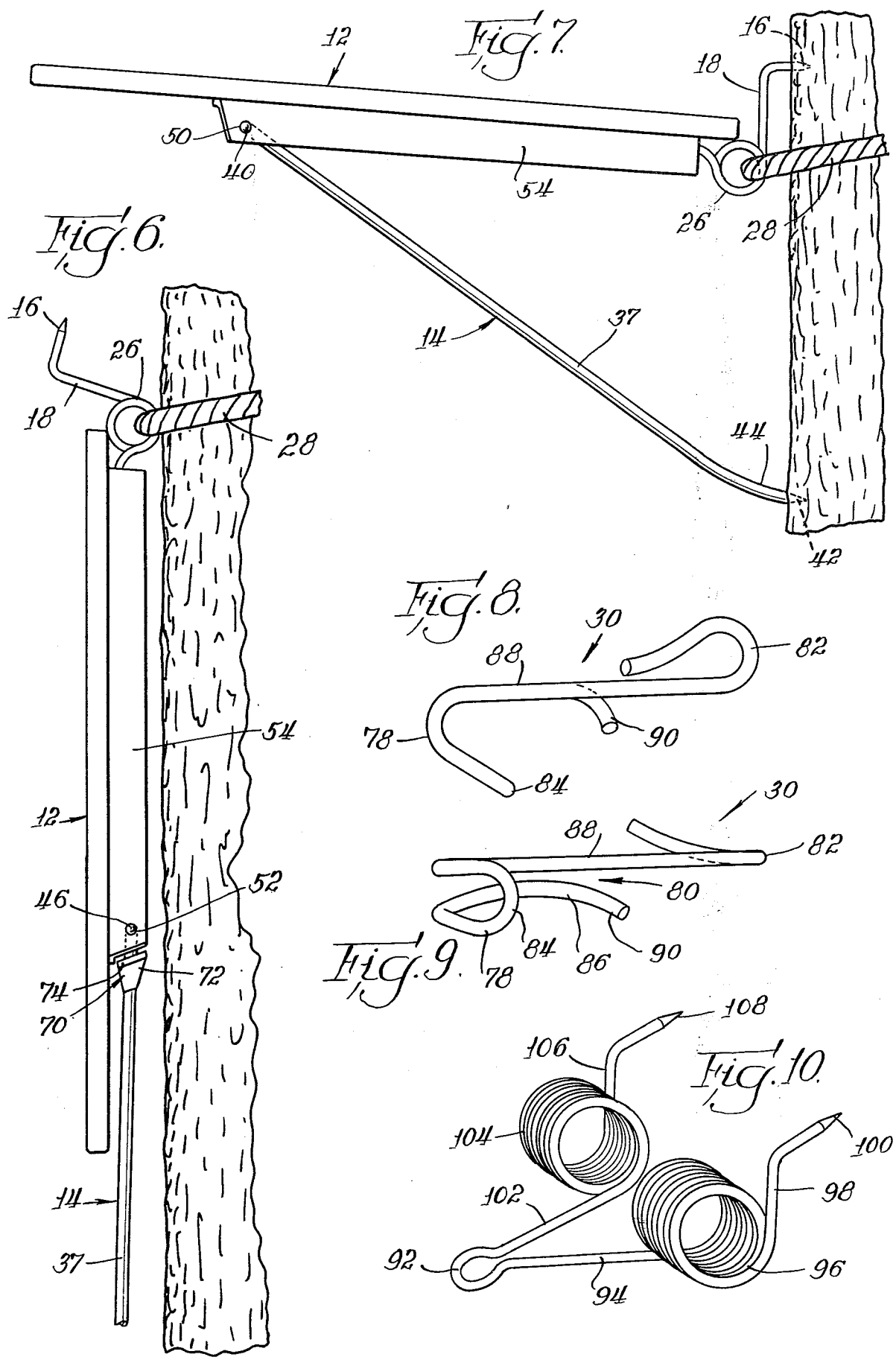

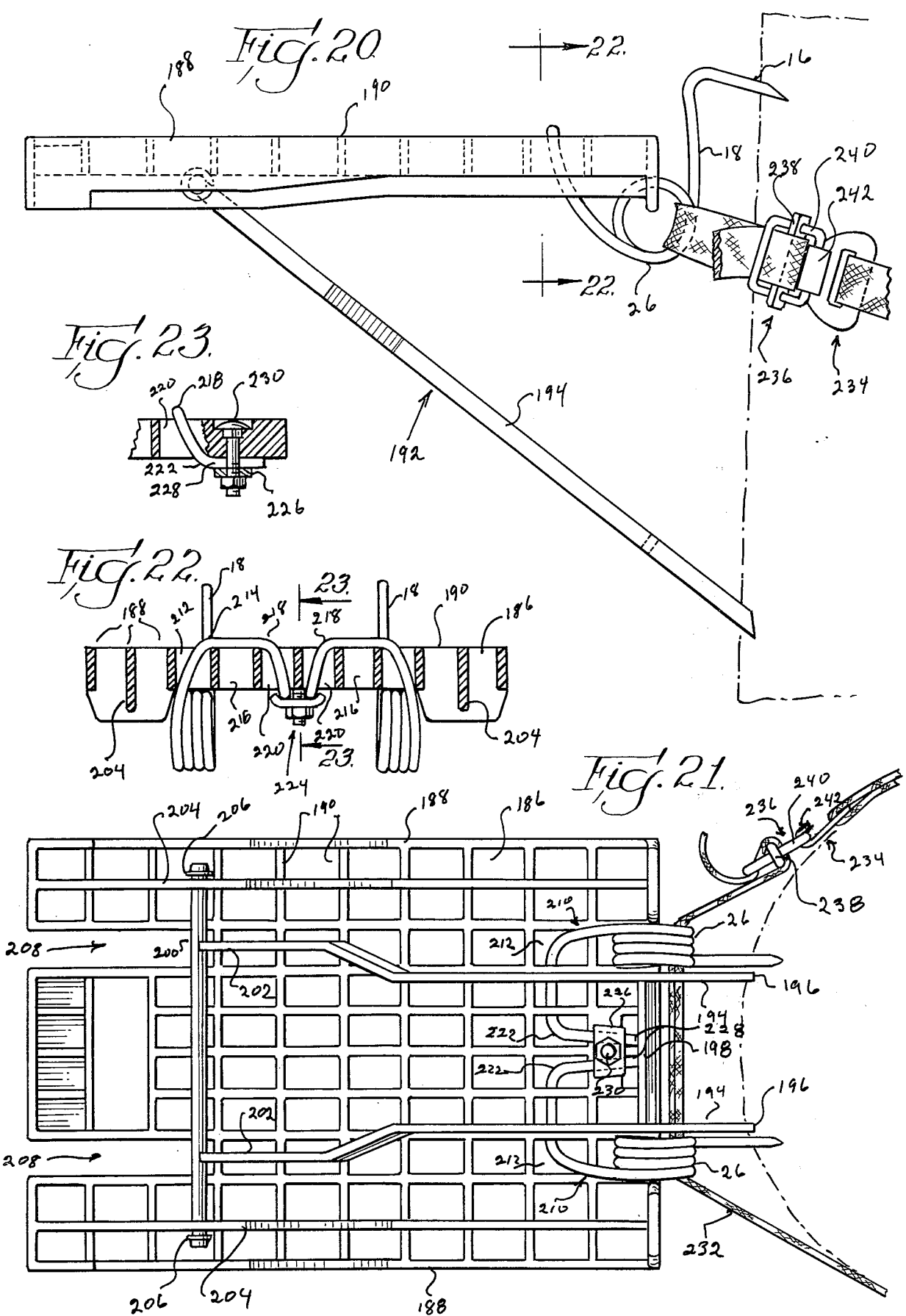

019# PORTABLE SUPPORT

BACKGROUND OF THE INVENTION

1. Field of Invention

The invention relates to a tree seat, tree stand, or tree table which is portable and easily attached to a tree.

2. Prior Art

Portable tree seats or stands are well known in the art. Note, for example, the following U.S. Pat. Nos.: 2,855,980; 2,964,200; 3,338,332; 3,392,802; 3,394,203; 3,419,108; 3,513,940; 3,749,200; and, 3,949,835. All of these devices are, for the most part, either complicated in structure or difficult to attach.

OBJECTS OF THE INVENTION

It is an object of the invention to provide a new and useful portable support adapted to be attached to a tree or like vertical column, and when so attached, to function as a seat, a tree stand, a table, or the like. It is a further object of the invention to provide such a device which is simple in construction and easy to attach to a tree. It is a further object of the invention to provide such a device which is light weight and easily portable. It is a further object of the invention to provide a device which can be attached to a tree and when so attached, is firmly anchored thereto. It is a further object of the invention to provide such a device which, when anchored to a tree in horizontal position, is forced by spring pressure to rotate downwardly about the point of attachment to the tree. It is a further object of the invention to provide such a device in which the downward rotation causes it to be more firmly anchored to the vertical column. Further objects of the invention are to avoid the disadvantages of the prior art and to obtain such advantages as will appear as the description proceeds.

BRIEF DESCRIPTION OF THE INVENTION

The invention relates to a portable support adapted to be attached to a tree or a vertical column and when so attached to function as a seat, a tree stand, a table, or the like which portable support comprises a planar support member, means for tying the rear end thereof to a tree, means for supporting the planar support member in horizontal position, and spring-loaded means tending to cause said planar support member to rotate downwardly about the point of attachment to the vertical column and to force the support member into firm engagement with the vertical column. More particularly, the invention relates to such a portable support which comprises a planar support member, tie means for tying said planar support member to said vertical column, tie-attaching means for attaching said tie means to said planar support member with said planar support member initially in a vertical position along side said vertical column, said tie-attaching means being located beneath said planar support member at the rear edge thereof, and said tie means being adapted to draw said tie-attaching means against said vertical column, column engaging means located at the rear edge of said planar support member a substantial distance above said tie-attaching means and adapted to engage said vertical column when said planar support member is rotated up to a horizontal position, spring means interposed between said tie means and said column engaging means, said spring means being adapted to be biased in spring-loaded position by the rotation of said planar support member to horizontal position, whereby the planar support while in horizontal position, is constantly urged by the bias of said spring means to rotate towards the initial position along side the vertical column, and brace means for holding said planar support member in horizontal position, said brace means being adapted to engage said vertical column and to be held in engagement with said vertical column by the tendency of said planar support member to rotate toward said vertical column.

In accordance with one form of the invention, the spring means is interposed between the engaging means and the planar support member in a position to spring bias the engaging means away from said planar support member, whereby when said planar support member is rotated up to the horizontal position, said engaging means is spring pressed into engagement with said vertical column and said planar support member is spring biased away from said vertical column.

In accordance with another modification of the invention, the spring means is interposed between the tie means and the planar support member in a position to spring bias the planar supporting member toward said vertical column, whereby when said planar support member is rotated up to horizontal position, said spring means is biased and tends to pull said planar support member toward said vertical column. Advantageously, in the latter modification, stop means is provided to limit the extent to which the spring means can be biased thereby to limit the distance the planar support member can be moved away from the vertical column against the bias of said spring means whereby, when the planar support member is rotated toward horizontal position and the stop means is engaged, further rotation will force the engaging means into firm engagement with the vertical column. Advantageously, the engaging means are piercing points adapted to pierce a tree, so that when the planar support member is rotated toward horizontal position and engages the stop means, further rotation to horizontal position will force the piercing points into the tree.

Advantageously, the supporting means which supports the planar support member in horizontal position comprises a brace member adapted to be attached at one end near the front of said planar support member and to engage the vertical column with its other end. Thus, the spring load on the planar support member which tends to cause it to rotate down toward its initial position, keeps the brace member firmly in engagement between the planar support member and the vertical column. Advantageously, the spring means and the column engaging means are integral parts of a metal spring member. Thus, a heavy spring wire may be coiled, bent, and pointed to provide both spring means and piercing point column engaging means. Also, the coiled portion of the spring member may be so located with respect to the piercing points that the coiled portion can function as the tie-attaching means. Advantageously, the coils of the spring member are located below the bottom plane of the planar support member and the piercing points are located above the plane of the top of the planar support member. There is thus provided ample leverage for loading the spring member when the planar support member is rotated up to the horizontal position.

Advantageously, the brace member comprises linear rods and cross members forming with said rods a trapezoid, the base of which is hinged to the planar support member. Said rods may have piercing points at the edge which engage the vertical column, so that when the planar support member is rotated to a position slightly above the horizontal position, the piercing points of the rod members are brought into engagement with a tree, and the planar support member moved down to horizontal position, these piercing points will be forced into the tree and held there by the spring action.

Advantageously, the brace member is removable so that it can be detached from the planar support member and attached thereto after the planar support member is raised to horizontal position. This makes it possible to attach the planar support member near enough to the ground to form a seat or a table.

Advantageously, the means for pivoting or hinging the brace member to the planar support member is such that the brace member can swing through a full 180° from a point where the piercing points or engaging means of the linear rods project beyond the rear end of the planar support member to a position where they project beyond the front end of the planar support member. Advantageously, means is provided for preventing the removal of the brace while it is in supporting position, such means, desirably, becoming operative only when the linear rods are rotated to or toward the front end of the planar support member.

Advantageously, at least one of the linear rods is adapted to engage a coil or loop of the spring member frictionally to hold the brace member flat against the planar support member.

Advantageously, the hinge for the brace member comprises a cross member having extensions journaled in bearing members. This cross member is adapted to be shifted laterally to remove one end from one bearing, then shifted laterally in the other direction to remove the other end from the other bearing and thus to disengage the brace member. Advantageously, stop means is provided to prevent lateral movement of the brace member when it is in supporting position and closed position but operative to permit said lateral movement only when the brace means is extended beyond the front end of the planar support member.

In accordance with one modification of the invention, the tie means comprises a rope extending through or attached to the tie-attaching means, having at one end a quick-cinching hook. In accordance with another modification, the tie means comprises two strap portions to be buckled or hooked together with a quick-release, draw-tight buckle, such as used in seat belts.

When the spring means is interposed between the tie means and the planar support member which, advantageously, comprises a coil spring member similar to that used in a mouse trap or rat trap, which is adapted to lie flat against the planar support member. One end extends from the coil and is fastened to the planar support member and the other end extends across the surface of the planar support member and terminates in a tie-attaching means to which one end of the tie means is attached. When the planar support member is placed flat against the tree, the tie means cinched up, the tie means will hold the extended edge of the spring member in a position such that on rotation upwardly of the planar support member, the spring means will be cocked and the extended member, which includes the tie-attaching means, will then be essentially normal to the planar support member. If desired, means in the form of a slotted strap or simply a chain is attached thereto to limit the movement past the normal position. Thus, when the planar support member is rotated toward the horizontal position and the stop means is engaged, further rotation to the horizontal position will force the engaging means into firm contact with the vertical column, and if they are piercing points, it will force the piercing points into the vertical column.

Essentially the same results can be obtained by providing a spring means between the tie means and the tie-attaching means which is of the type, which on extension, goes solid. Such spring means are the type commonly used on spring doors or in boat steering hookups and comprise a compressible coil spring with one attaching means extending through the coil spring and attached to the opposite end of the coil spring, and the other attaching means extending in the other direction through the coil spring and similarly attached to the end of the coil spring.

When devices of this type are attached to the tree, if the engaging means or piercing points do not engage the vertical column firmly enough, the planar support may be lowered and the tie means tightened up, as required, so that when the planar support is again raised to vertical position, the engaging means will be brought firmly into contact with the vertical column or the piercing points will pierce the tree the requisite amount.

In accordance with another modification of the invention, the spring means can comprise a leaf spring adapted to cause the attaching means or piercing points to move away from the planar support member. Alternatively, the spring means can comprise a flat spring member shaped to provide a loop which can function as the tie-attaching means with an upwardly projecting portion having a piercing point attached thereto.

In accordance with another modification of the invention, the spring means can comprise a coil spring adapted to surround an elongated piercing point and to be compressed when the piercing point is moved toward the planar support member. Such a coil spring can be housed in a housing mounted on top of the planar support member, or can be enclosed in a housing inset in the planar support member, like the spring-actuated bolt of a door lock, in which case, the tie-attaching means, desirably, is a bracket extending below the planar support member so as to provide the requisite space between the engagmeans and the tie-attaching means to provide the leverage necessary to cock the spring when the planar support member is rotated to horizontal position. If desired, the depending tie-attaching means can be constructed so that it is adapted to be folded flat against the planar support member.

In accordance with a preferred modification, the platform is made of molded plastic, such as polypropylene, polycarbonate, nylon, polyurethane elastomer, or polyurethane high density foam, and may be reinforced with metal, fiberglass, or the like. Advantageously, the molded platform is cast in the form of a grid in order to reduce the weight and in order to reduce accumulation of dirt and the like on the top surface thereof thereby to give better footing when used as a tree stand. Also, the brace, or platform support, is adapted to swing up through slots in the platform so that it need not be removed when the seat is fastened to the tree of like vertical column in a low position. Advantageously, the coil springs have their rear free ends bent to go up through one of the apertures of the grid and down through another where they are bolted to the platform. Advantageously, also, the tie consists of a belt much like the seat belts in an automobile having buckle parts at each end adapted for quick fastening, one of which has a draw-tight device, so that the belt can be drawn tight once it is fastened.

BRIEF DESCRIPTION OF THE DRAWINGS

In the drawings:

FIG. 1 is a perspective view showing a tree seat according to the invention attached to a tree.

FIG. 2 is a bottom view of the tree seat of FIG. 1, with the brace in a closed position.

FIG. 3 is a side view of FIG. 2.

FIG. 4 is a detailed view of means for attaching the brace member to the tree seat.

FIG. 5 is a detailed view of the means for attaching the spring member to the tree seat.

FIG. 6 is a side view showing the tree seat attached to the tree with the tree seat hanging down along side the tree.

FIG. 7 shows the tree seat rotated to slightly above horizontal position.

FIG. 8 is a side view of a quick cinch hook.

FIG. 9 is a plan view of FIG. 8.

FIG. 10 is a view of a modified form of the spring member.

FIG. 20 is a view similar to FIG. 7 of another form of the invention.

FIG. 21 is a bottom view of FIG. 20.

FIG. 22 is a detailed view in partial section of FIGS. 20 and 21.

FIG. 23 is a detailed view in partial section of FIGS. 20, 21, and 22.

DETAILED DESCRIPTION OF THE INVENTION

Figure 11:
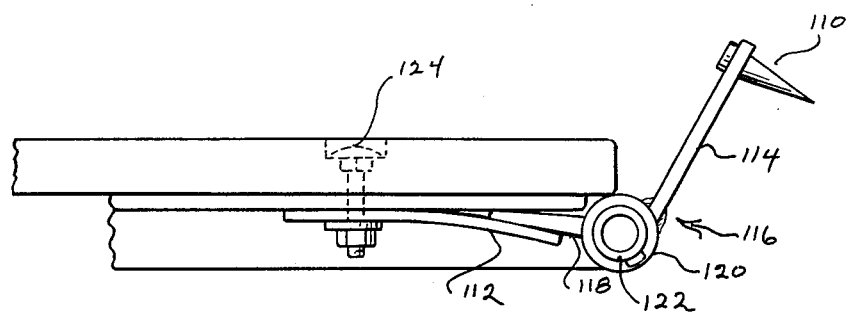
FIG. 11 is a partial view showing a modified form of the spring member and the piercing point member.

Referring now particularly to FIGS. 1 through 9, there is shown a tree seat having a platform or seat member 12, a brace or support member 14, tree engaging piercing points 16, which are normal to upwardly projecting portions 18 of coil springs 20 and 26, the other end of which, 22, is anchored to the platform 12 by the bolt 24.

The coils or loops of the coil springs 20 and 26 function as tie-attaching means through which the tie rope 28 is passed. At one end of the tie rope 28 is a quick-cinch hook 30 so that the tie rope may be drawn tight around the tree and chinched thereto in one quick, easy movement. This brings the coils or loops 20 and 26 into contact with the tree with the platform hanging down along side of the tree as shown in FIG. 6.

The upwardly projecting portions 18 of the coil springs 20 and 26 projects upwardly at an acute angle to the plane of the platform and the piercing points 16 projects normally from the upper ends of the upwardly projecting portions 18 toward the tree. The other ends 22 of the coil springs 20 and 26 are bent into loops 32 through which the bolts 32 pass, so that the other ends 22 of the coil springs are bolted firmly to the platform 12.

The support member 14 comprises two linear rods 36 and 37 connected by a short crosspiece 38 and a long crosspiece 40 in a trapezoidal structure. The linear rods 36 and 37 project beyond the short cross member 38 and terminate in piercing points 42 which are bent upwardly at a slight angle as shown at 44.

The long crosspiece 40 has projecting ends 46 and 48 which function as trunnions which are journaled in the bearing apertures 50 and 52 formed in the angle pieces 54 and 56. The angle pieces are bolted to the platform by bolts 24 and 58 and extend rearwardly parallel to the linear rods 36 and 37 and terminate under the bent loops 32 to provide a firm support against which the loops 32 are bolted to the platform. The rear ends of the angle pieces 54 and 56 are provided with apertures as at 60, adapted to receive a bent up portion 62 of the bent loop 32.

The long crosspiece 40 has a stop 66 adjacent the end 48, which stop is adapted to abut the angle piece 56 and thus prevent lateral movement of the long crosspiece 40 toward that angle piece. The opposite end 46 of the long crosspiece 40 has a coil spring 68 interposed between the angle piece 54 and the linear rod 36 which functions to keep the stop 66 pressed against the angle piece 56 and yet allow crosspiece 40 to be moved laterally to disengage the end 48 from the angle piece 56. Movement of the angle piece in the opposite direction then allows the end 46 to be disengaged and the support 14 to be removed from the platform.

The linear rod 36 is provided with a stop 70 in the form of an angle piece having one leg 72 welded to the linear rod 36 and the other leg 74 projecting toward the angle piece 54. The stop 70 prevents the long crosspiece from being moved laterally a distance sufficient to disengage the end 48 from the angle piece 56, except when the support 14 is rotated to the position shown in FIG. 4. In this position, the leg 74 of the angle piece 70 is beyond the end of the angle piece 54, so that the long crosspiece 40 can be moved laterally against the spring 68 sufficient to allow the end 48 to be withdrawn from the angle piece 56. Advantageously, the angle piece 54 is cut at an angle as shown in FIGS. 3 and 4 and the leg 74 of the angle piece 70 is canted complementary to the slope of the end of the angle piece 54.

The stop 66 is spaced from the linear rod 37 such a distance that when the support member 14 is in the closed position shown in FIGS. 2 and 3, the linear rod 37 frictionally engages the coil 26 to hold the support 14 in closed position. The spring 68 thus functions also to press the linear rod 37 into engagement with the coil 26.

In mounting the device around a tree as a tree stand with the support 14 extended, the platform 12 is placed against the tree along side thereof, as shown in FIG. 6, and the tie rope hooked into the hook portion 78 of the hook and crawn as tight as it can be drawn and then quickly looped over into the cinch 80 between the free end 86 and the shank 88. The platform 12 is then raised up toward the horizontal position. At some intermediate point, the piercing points 16 will engage the tree and thereafter the springs 20 and 26 will be loaded or placed under tension. The upward movement is continued to a position just above the horizontal as shown in FIG. 7.

The support 14 is then set with its piercing points in contact with the tree as shown in FIG. 7. The platform is then pulled down to the horizontal position, thus forcing the piercing points 42 of the support 14 into the tree. In this position, the coil springs 20 and 26 continually act to tend to move the platform back toward its original position, thus keeping the support 14 firmly engaged with the tree.

If the support is used as a seat or table, it is necessary to remove the support 14 because the platform will not be attached to the tree high enough for the support 14 to hang down freely beneath the platform. The support 14 is then attached when the platform is raised.

As shown in FIGS. 8 and 9, the quick-cinch hook 30 comprises a hook portion 78 and a jamb portion 80. The rope is looped around the hook portion 78, drawn tight, then swung around up into the jamb portion 80 and pulled tight. The hook is made of a singly heavy wire having a looped end 82 to which the rope is tied and a hook portion 78. The hook portion is formed in a portion of the wire which is bent back on itself forming the bite 84 with free end 86 extending upwardly parallel with the shank 88 which connects the loop end 82 and the hook portion 78. The upper end portion of the free end 86 is bent outwardly as shown at 90, so that the free end 86 tapers away from the shank portion 86, so that when the rope is inserted between the outwardly bent portion 90 and the shank 88 and pulled down, it is wedged in between the free end 86 and the shank portion 88.

In FIG. 10, there is shown a modification of the coil springs in which both coils and the attaching means are formed of a single integral spring wire. The mid-point of the wire is formed into an attaching loop 92 adapted to be bolted to the platform 12, one leg, 94, of which is extended to and forms coil 96, extension 98, and piercing point 100. The other end 102 extends to and forms coil 104, extension 106, and piercing point 108.

Figure 12:
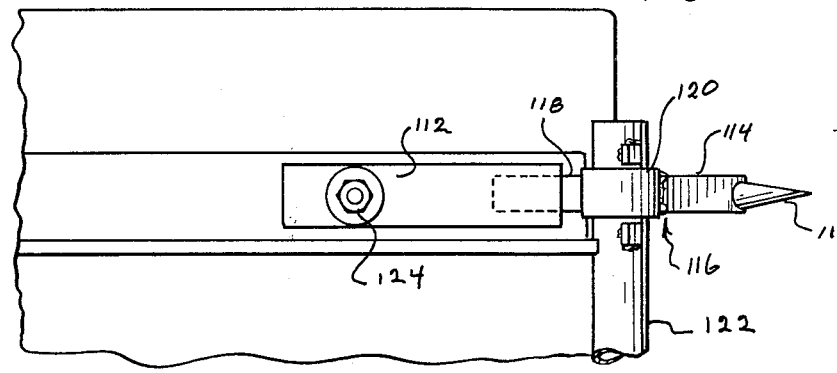
FIG. 12 is a bottom view of FIG. 11.

In FIGS. 11 and 12 there is shown a modification in which the piercing points 110 are spring pressed by means of a leaf spring 112. The piercing points 110 are fastened to the upper end of the upright arm 114 of an L-shaped member 116 and a short arm 118 attached to underlie the leaf spring 112. The L-shaped member is constructed of rigid material so that the relative positions of the arms 114 and 118 are always the same and the L-shaped meber has a bearing 120 which is journaled on the shaft 122 which is affixed to the planar support member 12. The leaf spring 112 is fastened to the planar support member 12 by the bolts 124. The shaft 122 is hollow so that a tie rope can be threaded through it and so function as tie-attaching means.

When the device of FIGS. 11 and 12 is tied to a tree with the planar support member in horizontal position, the piercing points 112 will be brought into contact with the tree when planar support member 12 is rotated toward the horizontal position and, as rotation is continued, short arm 118 will be pressed against leaf spring 12 to put the device under spring tension, as described above.

Figure 13:
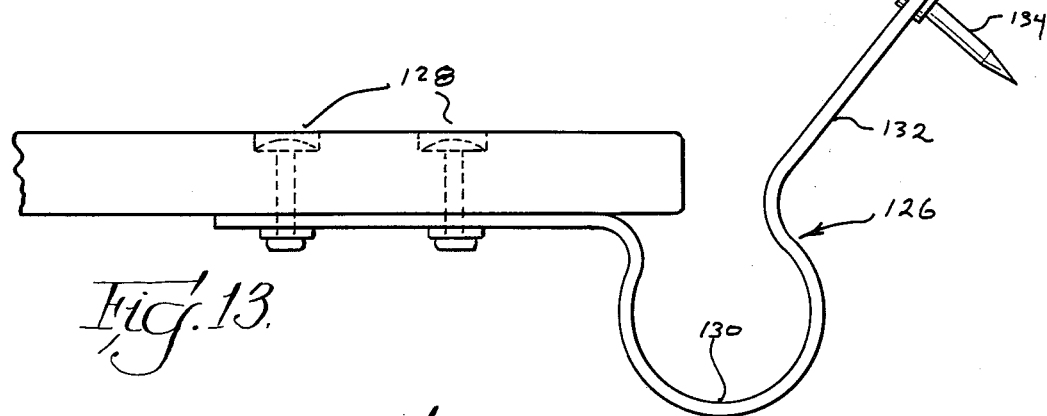
FIG. 13 is a partial side view of another form of the invention.

In the modification shown in FIG. 13, a flat spring 126 is bolted to the bottom of the planar support member 12 by bolts 128, is bent into the loop 130 which is adapted to function as tie-attaching means, and then up at an angle in linear extension 132 at the end of which the piercing points 134 are attached. This device functions essentially in the same manner as the other modifications described above.

Figure 16:
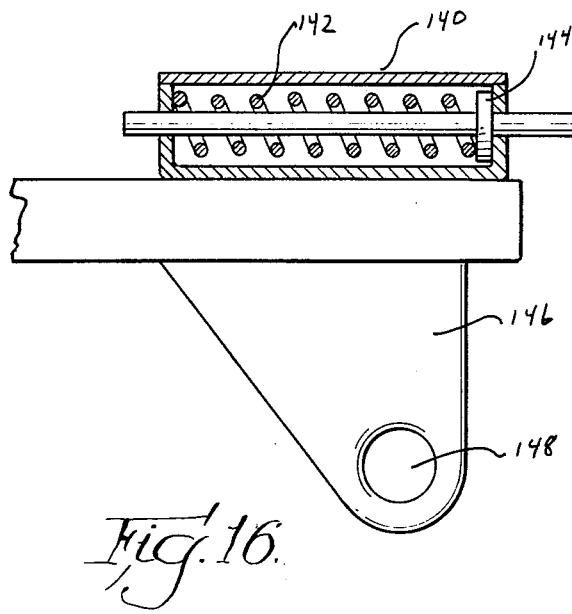
FIG. 16 is a partial view in partial section of yet another form of the invention.

In FIG. 16 there is shown a modification in which the piercing points 136 are on the end of a rod 138 which is adapted to reciprocate in a housing 140 containing a coil spring 142. The rod 138 has a fixed collar 144 attached thereto adapted to rest against the end of the coil spring 142. Underneath the planar support member 12 is a bracket 146 having an eye or aperture 148 through which the tie means can be threaded. The eye 148 is sufficiently below the rod 138 or piercing points 136 to give the necessary leverage for cocking the spring 142 when the device is attached to a tree and moved to horizontal position as already fully described.

Figure 14:
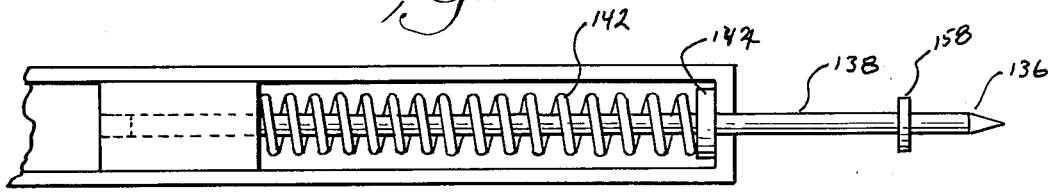
FIG. 14 is a partial side view in partial section of another form of the invention.

FIG. 14 is a modification of FIG. 16 in which the rod 138 is mounted to reciprocate into the planar support member 12. The planar support member 12 thus functions in lieu of the housing 140 in FIG. 16.

Figure 15:
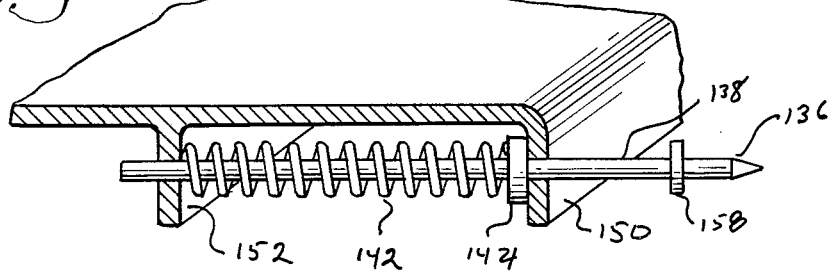
FIG. 15 is a partial view in partial section of still another form of the invention.

In FIG. 15, there is a modification of FIG. 14 in which the planar support member 12 is of a molded or cast structure having a front flange 150 and an interdepending flange 152 having complementary bores 154 and 156 in which the rod 138 is adapted to reciprocate.

In the modification shown in FIGS. 14 and 15, there is provided a stop collar 158 which functions to limit the extent to which the rod can reciprocate into the planar support member 12 and also the extent to which the piercing points 136 can pierce the tree.

Figure 17:
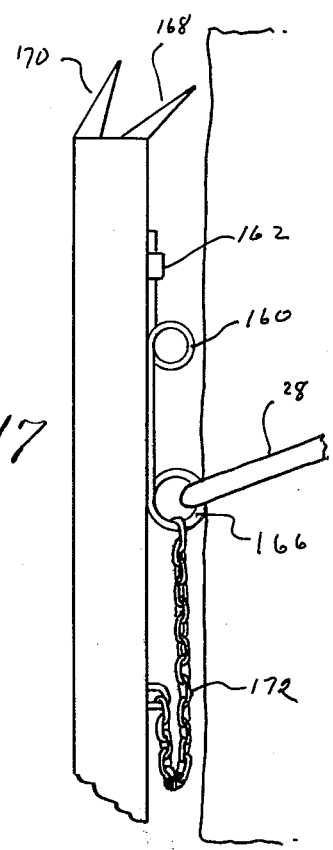
FIG. 17 is a view similar to that of FIG. 6 of another form of the invention.
Figure 18:
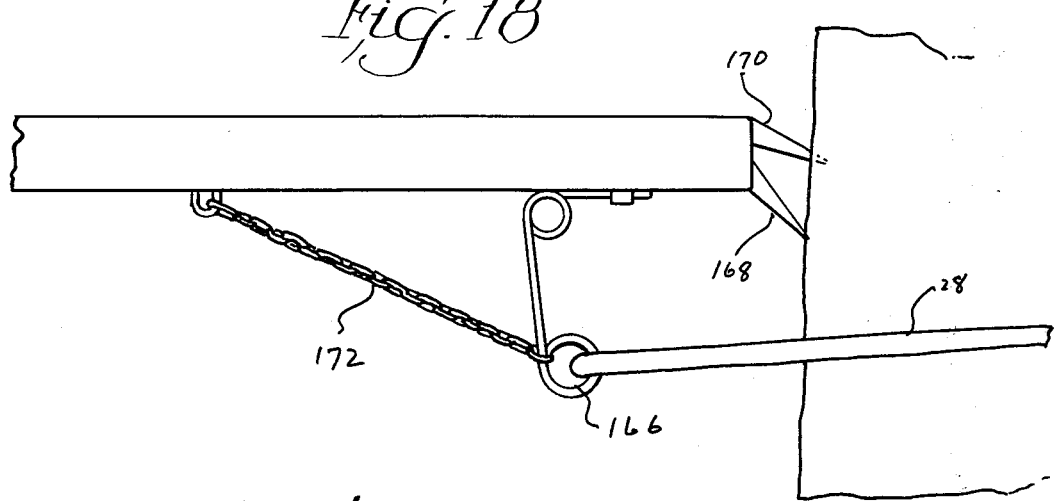
FIG. 18 is a view similar to FIG. 7 of the form of the invention shown in FIG. 17.

In the modification shown in FIGS. 17 and 18, there is provided a coil spring 160, one free end of which is adapted to be fastened to the planar support member 12 by fastening means 162 and the other free end of which terminates in the tie-attaching eye 166.

Projecting from the rear edge of the planar support 12 are two piercing points 168 and 170. The piercing point 168 is attached near the bottom of the rear edge of the planar support 12 and angled away from the bottom surface of the planar support member 12. The piercing point 170 is attached near the upper portion of the rear edge of planar support member 12 and angles in the same direction but at a lesser angle than the angle of the piercing point 168. Thus when the device is attached along side a tree essentially as shown in FIG. 17, the planar support member 13 raised toward the horizontal position, the piercing point 168 will first be engaged to the tree and then as rotation is continued, the piercing point 170 will engage the tree as shown in FIG. 18.

A chain 172 is connected from the planar support member 12 to the eye 166 and limits the extent to which the coil spring 160 can be biased as shown in FIG. 18. The coil spring 160 is located relative to the rear edge of the planar support 12 to compensate for any slack present in the tie 28. This is shown in exaggerated from in FIG. 18 or in a form in which: tie 28 is loosely attached to the tree. When the chain 172 stops the movement of the eye 166, the spring means will go solid by means of the chain 172 and further rotation toward the horizontal will force the piercing point 170 into the tree.

Figure 19:
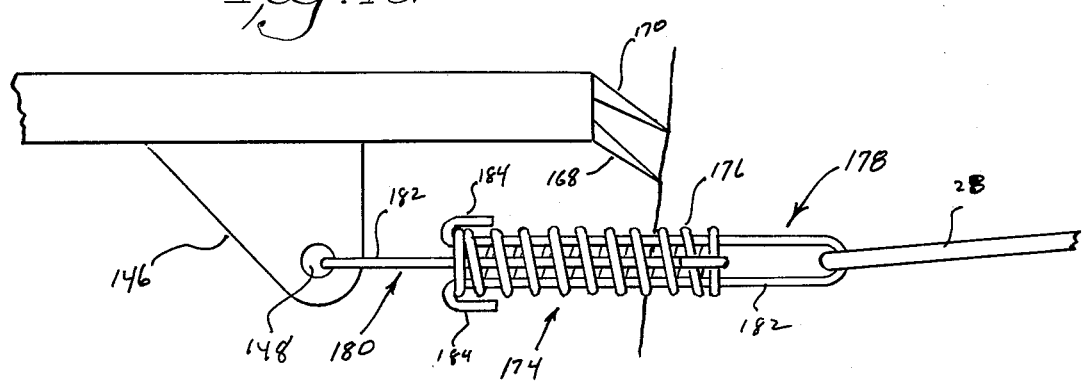
FIG. 19 is a view similar to FIG. 18 of another form of the invention.

In the modification shown in FIG. 19, there is provided a tie-attaching bracket 146 with an eye 148 and interposed between the eye 148 and the tie 28 is a spring means 174 comprising a coil spring 176 adapted to be put under compression when a pull is placed on the connectors 178 and 180. These connectors comprise a loop of wire 182 extending through the coil 176 terminating in the hooks 184 which engage the opposite end of the coil spring 176.

In operation of the device shown in FIG. 19, the tie 28 is tied sufficiently tight so that when the planar support member 12 is rotated toward horizontal position, the coil spring 176 will go solid somewhat before the horizontal position is reached so that continued movement toward the horizontal position will then force the piercing point 170 into the tree. If this condition is not reached on the first try, the planar support member 12 can be lowered and the tie 28 taken up a little more and the operation repeated. When the adjustment is proper, the piercing point 170 will be forced into the tree and the spring will be operative to cause the planar support member 12 to tend to rotate back toward the vertical position. Thus, when the brace, not shown in this figure, is put in place, its piercing points will be forced into the tree by the spring action of the spring 176 and the planar support 12 will be firmly attached in horizontal position.

In the modification shown in FIGS. 20 through 23, there is shown a planar support member molded from a plastic material in the form of a grid having a plurality of rectangular apertures 186 formed by a plurality of longitudinal ribs 188 and a plurality of transverse ribs 190. This grid is advantageously molded of polypropylene or like tough cheap rigid plastic material, but if desired, can be molded of other plastic material, such as, polycarbonate, nylon, polyesters, hard polyurethane elastomers, and hard polyurethane high-density foams. If desired, the plastic can be reinforced with metal or fiberglass.

The brace member 192 comprises bars or rods 194 sharpened at one end into piercing points 196 and spaced apart by a tie bar 198 and by the shaft 200 to which the ends 202 of the bars 196 are welded or otherwise attached. The shaft 200 is journaled in the transverse ribs 204 which extend downwardly below the other transverse ribs 188 sufficiently for this purpose and the shaft 200 is provided with collars 206 to prevent substantial lateral movement of the shaft in one way or the other.

The planar support member 12 is provided with slots 208 extending outwardly from the shaft 200 to the front edge of the planar support member 12 in registry with the portions 202 of the ribs 194. Portions 202 are long enough so that the brace 192 can be swung through the slots 208 to a position normal or beyond to the front or top face of the planar support member 12. Thus, the brace member 192 can be swung out of the way when the planar support member 12 is attached to a tree near the ground and then back into operative position after the planar support member 12 is raised to the horizontal position.

The coil springs 26 are constructed essentially in the same manner as coil springs 26 of the modification of FIGS. 1 through 9 with the linearly extending extension 18 and the piercing points 16 as described in that modification. However, the other free end portion 210 is bent to project upwardly through the grid opening 212 then bent at 214 to pass inwardly across grid opening 216 then bent at 218 to pass downwardly through grid opening 220 and bent at 222 to pass under the fastening device 224 comprising the plate 226 adapted to overlie the free ends 228 and to be bolted in place by the bolt 230.

Threaded through the coils 26 of FIG. 21 is a belt 232 made of non-stretchable fabric having at the ends thereof buckle portions 234 and 236. The buckle portion 236 has a draw-tight device 238 of conventional structure and a loop or ring 240 adapted to be seated in the hook 242.

Thus, when the device of FIGS. 20 through 23 is attached to the tree essentially in the position as shown in FIG. 6 and the belt 232 drawn tight, the planar support member 12 can be raised to slightly above the horizontal the brace member 192 seated and the prong points 196 forced into the tree. Of course, the prong points 16 will have been forced into the tree exactly as previously described.

It is to be understood that the invention is not to be limited to the exact details of operation or structures shown and described, as obvious modifications and equivalents will be apparent to one skilled in the art.

I claim:

1. A portable support adapted to be attached to a vertical column and, when so attached, to function as a seat, a tree stand, a table, or the like, which comprises:
   a planar support member;
   tie means for tying said planar support member to said vertical column;
   tie-attaching means for attaching said tie means to said planar support member with said planar support member initially in a vertical position along side said vertical column;
   column engaging means located at the rear edge of said planar support member a substantial distance above said tie-attaching means and adapted to engage said vertical column;
   spring means interposed between said tie means and said engaging means;
   said spring means being adapted to be biased in spring-loaded position by the rotation of said planar support member toward a horizontal position whereby the planar support member, while in raised position, is constantly urged by the bias of said spring means to rotate toward the initial position along side the vertical column; and
   brace means for holding said planar support member in horizontal position, said brace means being adapted to engage said vertical column and to be held in engagement with said vertical column by the tendency of said planar support member to rotate toward said vertical column under the influence of said spring means.

2. The portable support of claim 1, in which said spring means is interposed between said engaging means and said planar support member in a position to spring bias said engaging means away from said planar support member whereby, when said planar support member is rotated up to the horizontal position, said engaging means is spring-pressed into engagement with said vertical column and said planar support member is spring-pressed away from said vertical column.

3. The portable support of claim 1, in which said spring means is interposed between said tie means and said planar support member and said tie-attaching means is in a position to spring bias said tie-attaching means toward said vertical column when said planar support member is rotated up to horizontal position, whereby said spring means when so biased tends to force said engaging means into engagement with said vertical column.

4. The portable support of claim 3, which comprises stop means which limits the distance the tie-attaching means can be moved away from said vertical column and in which said engaging means comprises piercing points, whereby when said planar support member is being rotated to horizontal position, the piercing points will engage the vertical column, the stop means will be engaged, and further movement of the planar support member toward the horizontal position will force the piercing points into the vertical column.

5. The portable support of claim 2, in which said column engaging means comprises piercing points.

6. The portable support of claim 2, in which said supporting means comprises a brace member hinged at one end near the front edge of said planar support and having a second colun engaging means at its other end having column engaging parts for engaging the said vertical column to hold said planar support member in horizontal position, said spring means when said planar support member is tied to said vertical column and lifted to or slightly above horizontal position, functioning to bias said planar support member downwardly and thereby to force said second column engaging parts firmly into engagement with said vertical column.

7. The portable support of claim 6, in which the first and second column engaging parts comprise piercing points.

8. The portable support of claim 7, in which said spring means and said column attaching means are integral parts of a metal spring member.

9. The portable support of claim 8, in which said spring member comprises loops located below the bottom plane of said planar support member and adapted to function as means for attaching said tie means to said planar support.

10. The portable support of claim 9, in which said metal spring member comprises spring steel wire and said loops comprise coils of said spring steel wire.

11. The portable support of claim 10, in which one end of each of said coils is fastened to the underside of said planar support and the other end extends linearly upwardly beyond the rear edge of said planar support member at an angle thereto.

12. The portable support of claim 11, in which one said piercing point is located at the upper end of each of said other ends of said coils.

13. The portable support of claim 6, in which said brace member comprises substantially linear rods tied together by cross members in a rigid structure, the base of which is hinged to said planar support member, said rods in the closed position lying under said planar support member and extending substantially beyond the rear edge of said planar support member.

14. The portable support of claim 13, in which at least one said rod frictionally engages said tie-attaching means.

15. The portable support of claim 6, in which said second column engaging parts comprise piercing points.

16. The portable support of claim 15, in which the piercing points of said second column engaging means angle upwardly at an acute angle to the plane of said brace member, whereby when said brace member is in supporting position, the piercing points are substantially normal to said vertical column.

17. The portable support of claim 16, in which said brace member comprises substantially linear rods united with front and rear crosspieces into a rigid structure, said rods, when said brace is in its closed position, lying under said planar support member and extending substantially beyond the rear edge of said planar supporting member.

18. The portable support of claim 17, in which the front crosspiece of said rigid structure has portions extending laterally beyond said rods, which extended portions are journaled in bearings and function therein as trunnions, said bearings and trunnions being the means whereby said brace is hinged to said planar support member.

19. The portable support of claim 18, which comprises means for permitting lateral movement of said brace member sufficient to withdraw first one trunnion from its bearing, and then the other trunnion from its bearing, whereby the brace member is detached.

20. The portable support of claim 19, which comprises spring means for biasing the lateral movement of said brace member.

21. The portable support of claim 19, which comprises stop means operative to prevent lateral movement of said brace member when it is in the supporting or closed positions, but operative to permit said lateral movement when said brace means is extended beyond its supporting position.

22. The portable support of claim 18, in which said planar support member has slots which register with said rods to which said rods can be swung to a position normal to the upper surface of said planar support member.

23. The portable support of claim 1, in which the tie means comprises a rope extending through holes in said tie-attaching means and having at one end a quick-chinch hook.

24. The portable support of claim 1, in which the tie means comprises strap portions having complementary buckle portions adapted to buckle said strap portions together.

25. The portable support of claim 24, in which at least one buckle portion has a draw-tight connection with the strap portion to which it is attached.

26. The portable support of claim 1, in which said planar support member is constructed in the form of a grid.

27. The portable support of claim 26, in which said planar support is constructed of molded plastic.

28. The portable support of claim 27, in which the spring means comprises coil springs, one free end of which is bent to pass upwardly through a hole in said grid, across to another hole in said grid, down through said other hole, and thence to a fastening device where said free end is fastened to the underside of said planar support member.

29. The portable support of claim 28, in which the other free ends of said coil springs extend linearly upwardly at an angle to a point above said planar support member where they are bent away from said planar support member at a substantially right angle to the linear portion of said other free end and terminate in piercing points.

30. A portable support adapted to be attached to a vertical column and, when so attached, to function as a seat, a tree stand, a table, or the like, which comprises:
   a planar support member;
   tie means for tying said planar support member to said vertical column;
   tie-attaching means for attaching said tie means to said planar support member with said planar support member initially in a vertical position along side said vertical column;
   column engaging means located at the rear edge of said planar support member a substantial distance above said tie-attaching means when said planar support is in vertical position along side of said vertical column and adapted to engage said vertical column;

spring means interposed between said tie means and said engaging means;

said spring means being adapted to be biased in spring-loaded position by the rotation of said planar support member toward a horizontal position whereby the planar support member, while in raised position, is constantly urged by the bias of said spring means to rotate toward the initial position along side the vertical column; and brace means for holding said planar support member in horizontal position, said brace means being adapted to engage said vertical column and to be held in engagement with said vertical column by the tendency of said planar support member to rotate toward said vertical column under the influence of said spring means.

* * * * *

UNITED STATES PATENT AND TRADEMARK OFFICE
CERTIFICATE OF CORRECTION

PATENT NO. : 4,113,057

DATED : September 12, 1978

INVENTOR(S) : Max E. Bessinger

It is certified that error appears in the above-identified patent and that said Letters Patent are hereby corrected as shown below:

Col. 3, line 21; "brace while" should read --brace member while--
Col. 7, line 18; "singly" should read --single--
Col. 7, line 42; "of an L" should read --of L--
Col. 8, line 42; "13" should read --12--
Col. 11, line 8; "colun" should read --column--

Signed and Sealed this

Fourteenth Day of November 1978

[SEAL]

Attest:

RUTH C. MASON
Attesting Officer

DONALD W. BANNER
Commissioner of Patents and Trademarks